Sept. 30, 1952    G. F. GIELOW ET AL    2,612,211
REMOVABLE CUSHION PLATE AND SEAT STANDARD
Filed May 16, 1950    2 SHEETS—SHEET 2
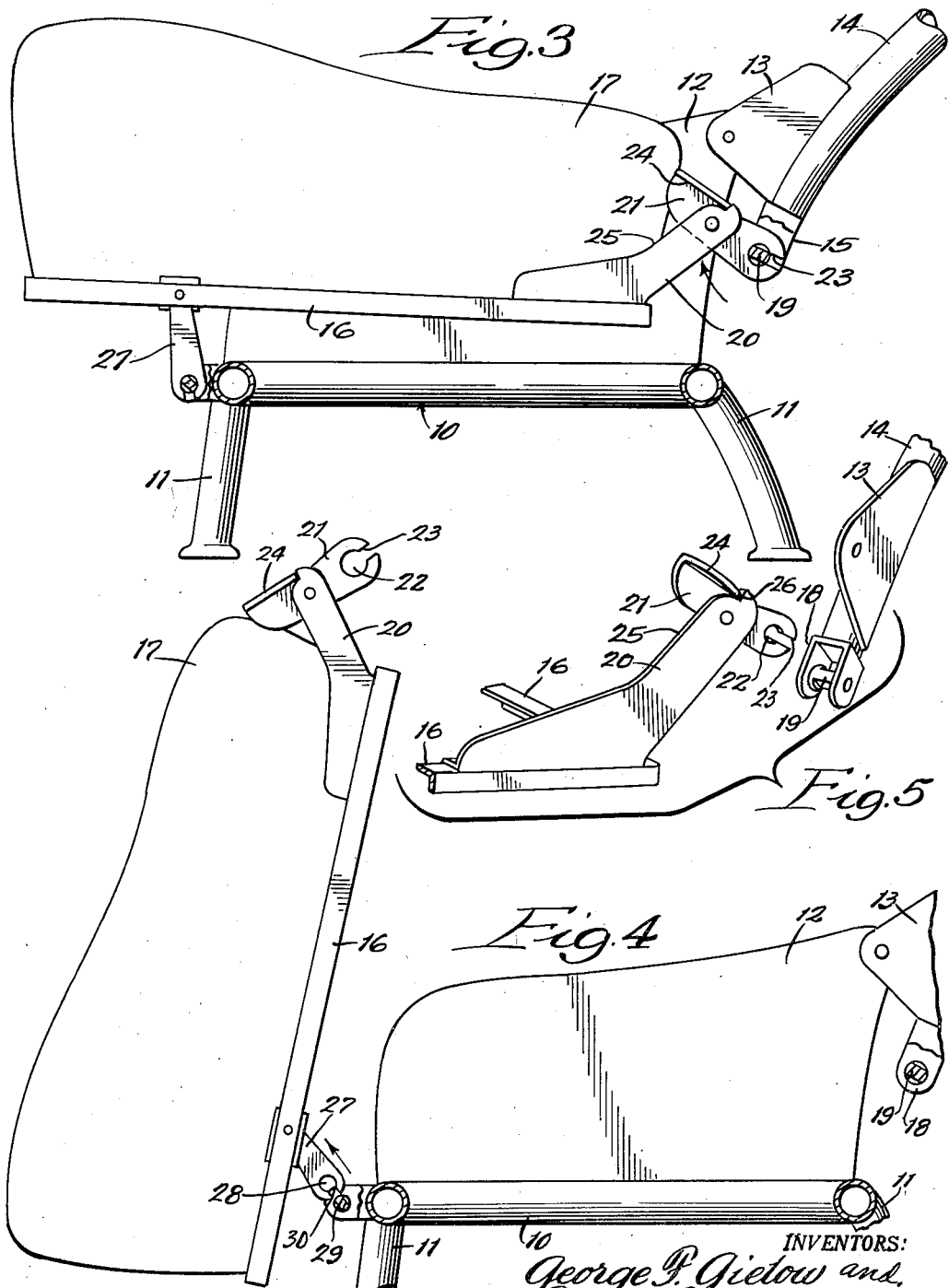
INVENTORS:
George F. Gielow and
Robert L. Edwards,
BY Dawson, Ooms, Broth and Spangenberg,
ATTORNEYS.

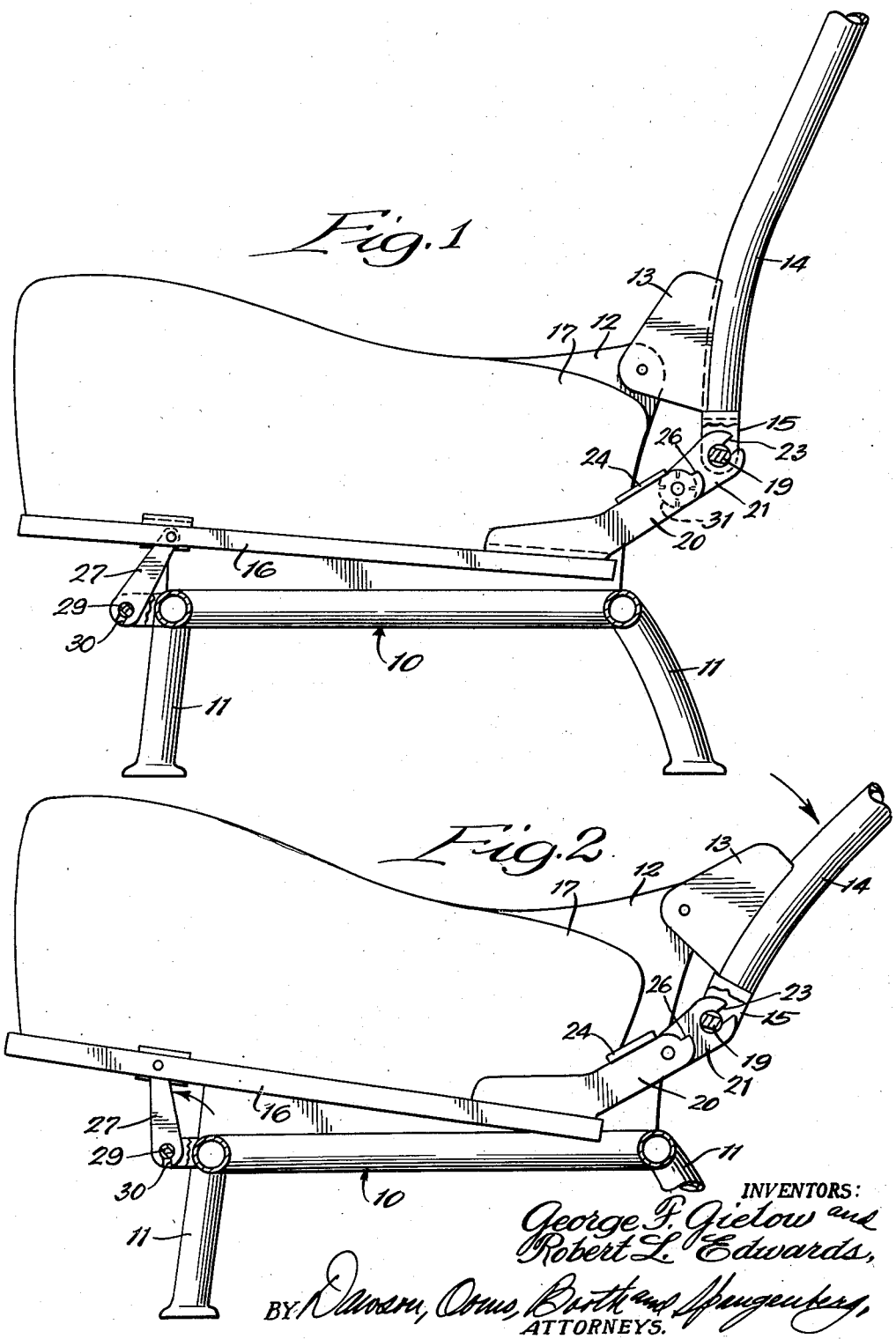

Patented Sept. 30, 1952

2,612,211

UNITED STATES PATENT OFFICE 2,612,211

REMOVABLE CUSHION PLATE AND SEAT STANDARD

George F. Gielow, Brookfield, and Robert L. Edwards, Oak Park, Ill., assignors, by mesne assignments, to American Seating Company, a corporation of New Jersey Application May 16, 1950, Serial No. 162,204

3 Claims. (Cl. 155—116)

This invention relates to a removable cushion plate and seat structure. This invention is particularly useful in connection with bus, railway, airplane and other vehicle seats which are provided with cushions and for which the cushions or their covers are from time to time replaced.

An object of the invention is to provide a seat structure equipped with means for securely holding a cushion plate in position for the normal operation of the seat, while at the same time providing simple means for the removal of the cushion plate or cushion structure when this is desired. A further object is to provide, in a seat structure, means for releasably locking a cushion plate at its front and rear portions while permitting both portions to be separated from the seat in a minimum of time and with a minimum of effort. Other specific objects and advantages will appear as the specification proceeds.

The invention is shown in an illustrative embodiment by the accompanying drawings, in which—

Fig. 1 is a side view in elevation, and partly in vertical section, of a seat structure and removable cushion plate therein embodying our invention; Fig. 2, a view similar to Fig. 1 but showing the back of the seat in rearwardly-tilted position; Fig. 3, a view similar to Fig. 2 but showing the cushion plate structure in its initial position for removal from the seat frame; Fig. 4, a view similar to Fig. 3 but showing the cushion plate structure in its final position for removal from the seat frame; and Fig. 5, a broken perspective view of the connecting means between the cushion plate structure and the seat frame.

In the illustration given, 10 designates a seat frame, including the legs or pedestals 11, and the side frame members 12. Pivotally mounted upon the side frame members 12 are the flanges 13 secured to the back member 14 which forms a part of the seat frame. The back member 14 has on each side tubular members which are provided with lower extensions 15. Since the seat frame just described is of an old and well-known construction, a further description of the details thereof is believed unnecessary.

Upon the seat frame described is mounted a cushion plate or frame 16. Upon the frame or plate 16 is mounted a cushion 17 formed of foam rubber, covered springs, or any other desired type of material, and the seat 17 is preferably provided with a suitable cover (not shown).

We equip the plate 16 with means for supporting it upon the seat frame and with connections which, while normally securing the cushion frame in sturdy attached relation to the seat frame for ordinary use, permit disengagement of the cushion frame from the seat frame when the parts are manipulated in a specific manner.

We equip the extensions 15 of the back portion of the seat frame with spaced flanges 18 between which extends a flattened pin 19, as shown best in Fig. 5. The cushion frame 16 is provided with an upwardly-extending bracket 20 upon which is pivoted a lever 21. The lever 21 is provided at one end with a circular recess 22 adapted to extend about the flat pin 19 and with a narrow escapement slot 23 adapted to snugly receive the flattened sides of the pin 19 during disengagement of the parts.

The lever 21 is provided at its top with a laterally-extending flange 24 adapted to rest upon the top edge 25 of the bracket 20 when the parts are in normal seat-forming relation. However, during disengagement the lever 21 may be swung upwardly to the position shown in Fig. 5. We prefer to provide the upper end of the bracket 20 with a ledge 26 engageable with the forward end of the flange 24 so as to stop the rotation of the lever 21 in the exact position in which the slot 23 is aligned with the flat walls of the pin 19.

Similarly, we provide the front portion of the plate 16 with a pivotally-mounted lever 27 having at its lower end a recess 28 for receiving a flattened pin 29 with which the seat frame 10 is provided at its forward end. Also, the lever is provided at its lower end with escapement slot 30 for permitting separation of the lever from the flattened pin 29, as illustrated in Fig. 4.

A spring-urged washer 31 may be provided for firmly urging the lever 21 into tight relation with the bracket 20 and, if desired, aligned bosses and indentations may be used for securing the parts readily against separation.

Operation

In the operation of the structure, the seat and cushion frame, as shown in Figs. 1 and 2, may be manipulated and operated in the usual seat and cushion-forming positions. The reclining position is shown in Fig. 2 and the vertical seat back position is illustrated in Fig. 1. It will be noted that in each of these extreme positions, there is no tendency for the cushion frame to become separated from the seat structure because at no time are the flat sides of the pins aligned with the slots of the members carried by the cushion frame. When it is desired to remove the cushion frame so that the cushion may be replaced or the cover therefor replaced, or for any other purpose, the parts are first swung to the position shown in Fig. 3. The lever 21 is moved upwardly to bring the rear end of the flange 24 into engagement with the ledge 26. Thus the narrow slot 23 is brought into direct alignment with the flat sides of the pin 19 and the cushion frame 16 may be swung upwardly to the position illustrated in Fig. 4. It will be noted that, in the position illustrated in Fig. 4, the slot 30 of the lever 27 is brought into alignment with the flat sides of the pin 29 and the lever may be thus drawn away from the pin and the entire cover plate moved to a place for repair, cleaning or replacement of the cushion or cover, etc.

Reassembly of the parts is made in the reverse order to the process described, the first being made as shown in Fig. 4 by bringing the lever 27 into interlocking engagement with the pin 29. Downwardly and rearwardly swinging of the frame 16 brings the parts to the position shown in Fig. 3, at which connection is made between the lever 21 and the pin 19. The lever 21 is then swung to locking position as illustrated in Figs. 1 and 2.

In the specific structure illustrated, we have shown the flattened pin carried by the seat frame and the recess and slot carried by the cushion frame. It will be understood that these parts may be reversed and further, that many changes may be made in the details of the structure.

While in the foregoing description we have shown the structure in considerable detail, it will be understood that such details may be varied widely by those skilled in the art without departing from the spirit of our invention.

We claim:

1. In a seat structure equipped with a seat frame and a reclining back pivotally mounted upon said seat frame, a cushion plate equipped with a rearwardly-extending bracket, a lever member mounted upon said bracket, said reclining back being provided with a depending member, connections between said members consisting of a flattened pin on one member and a circular recess in the other of said members provided with an escapement slot adapted to receive said pin when the flattened walls thereof are aligned with the walls of the slot, and means for releasably connecting the forward end of said cushion plate to said seat frame, said latter means comprising a pivotally-mounted lever member and a seat frame member, said members being provided with separable connections consisting of a flattened pin on one member and a pin-receiving annular recess on the other member, said last-mentioned member having an escapement slot adapted to receive said pin when the flat sides thereof are aligned with the slot walls.

2. In a seat structure equipped with a seat frame and a reclining back pivotally carried upon said seat frame, a cushion plate having a rearwardly-extending bracket, a lever member mounted upon said bracket, said reclining back being provided with a depending member, connections between said members consisting of a flattened pin on one member and a circular recess in the other of said members provided with an escapement slot adapted to receive said pin when the flattened walls thereof are aligned with the walls of the slot, and means for releasably connecting the forward end of said cushion plate to said seat frame, said latter means comprising a pivotally-mounted lever member and a seat frame member, said members being provided with separable connections consisting of a flattened pin on one member and a pin-receiving annular recess on the other member, said last-mentioned member having an escapement slot adapted to receive said pin when the flat sides thereof are aligned with the slot walls, said flat sides being alignable with said slot only after the release of said first-mentioned connection means between the cushion plate bracket and said reclining seat back.

3. In a seat structure equipped with a seat frame and a reclining back, a cushion plate equipped with a rearwardly-extending bracket, a lever member mounted upon said bracket, said reclining back being provided with a depending member, connections between said members consisting of a pin, having flattened walls, on one member and a circular recess in the other of said members provided with an escapement slot adapted to receive said pin when the flattened walls thereof are aligned with the walls of the slot, and means for releasably connecting the forward end of said cushion plate to said seat frame, said last-mentioned connection means being releasable only after said cushion plate has been separated from said reclining seat back, said reclining seat back being pivotally mounted upon said seat frame.

GEORGE F. GIELOW.
ROBERT L. EDWARDS.

REFERENCES CITED

The following references are of record in the file of this patent:

UNITED STATES PATENTS

| Number | Name | Date |
|---|---|---|
| 54,869 | Cronk | May 22, 1866 |
| 488,773 | Peck | Dec. 27, 1892 |
| 2,059,011 | Moewes | Oct. 27, 1936 |
| 2,073,315 | McManus | Mar. 9, 1937 |